Dec. 16, 1930.    C. G. MUNTERS    1,785,700
REFRIGERATION
Filed Dec. 20, 1929
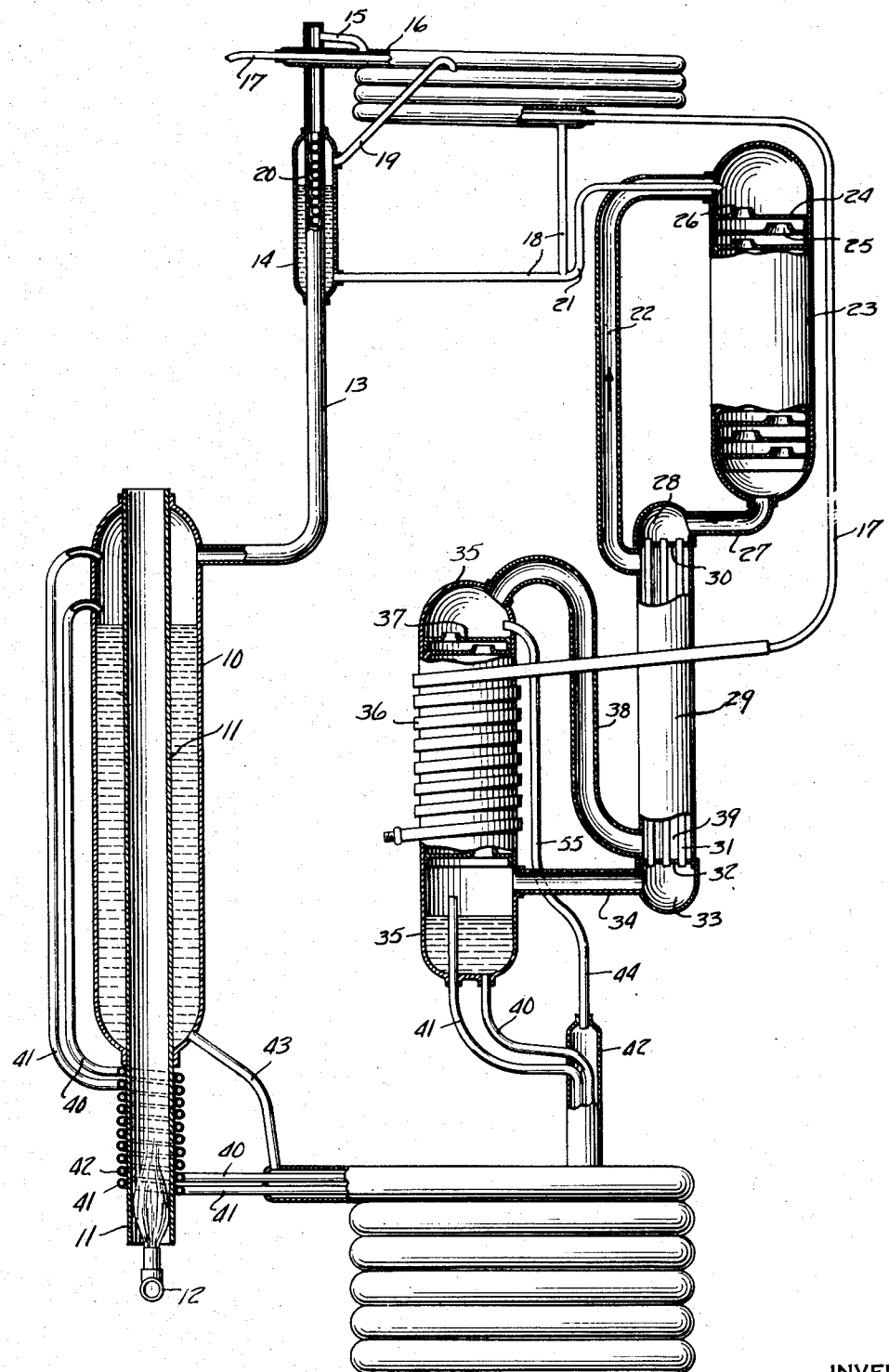
INVENTOR
Carl Georg Munters
BY
ATTORNEY Patented Dec. 16, 1930

1,785,700

UNITED STATES PATENT OFFICE

CARL GEORG MUNTERS, OF STOCKHOLM, SWEDEN

REFRIGERATION

Application filed December 20, 1929, Serial No. 415,374, and in Sweden January 21, 1929.

My invention relates to the art of refrigeration and particularly to refrigerating apparatus of the absorption type and still more particularly to continuous absorption apparatus wherein an inert gas is used to equalize the pressure throughout.

In an apparatus of this type circulation of the various fluids therein is caused to take place by force set up entirely within the system and hence no mechanical pumps or fans are required. One of the objects of my invention is to provide improved means for establishing a liquid circulation in an apparatus of this type.

Further objects and advantages inherent to my invention will appear from the following description taken in connection with the accompanying drawings which form a part of this specification and on which Fig. 1 is an elevational view, partially in cross-section, of a preferred embodiment of my invention.

Referring more particularly to Fig. 1, reference character 10 designates a generator centrally through which extends a flue 11. Flue 11 is arranged to be heated in any suitable manner as, for instance, by the gas burner 12. Communicating with the upper part of generator 10 is a conduit 13, part of which is surrounded by a rectifier jacket 14. A conduit 15 connects the upper end of conduit 13 with a condenser jacket 16 through which extends a cooling water conduit 17. The other end of jacket 16 is connected by means of a conduit 18 with the lower part of rectifier jacket 14, while the upper part of the jacket is connected by means of a conduit 19 with a more or less intermediate point of jacket 16. The interior of that portion of conduit 13 which extends within rectifier jacket 14 is provided with a number of apertured baffles 20.

A conduit 21 communicates with conduit 18, extends upwardly for some distance and thence within a conduit 22 and discharges within the upper part of an evaporator 23. Evaporator 23 comprises a closed cylindrical member in which is placed a series of discs 24 in which are formed apertures 25 surrounded by raised rims 26. A conduit 27 connects the bottom of evaporator 23 with a space 28 formed in one end of a gas heat exchanger 29. Space 28 is formed between one end of the heat exchanger and a tube head 30. Tubes 31 extend from tube head 30 to a similar tube head 32 placed near the other end of the heat exchanger. A space 33 is formed between tube head 32 and the adjacent end of the heat exchanger.

A conduit 34 connects space 33 with the lower part of an absorber 35. Absorber 35 comprises a closed cylindrical member around which is placed in heat exchange relation therewith a cooling water coil 36, one end of which is connected to cooling water conduit 17. A series of discs 37, which may be similar to discs 24 in evaporator 23 are placed within the absorber. A conduit 38 connects the upper part of absorber 35 with the lower part of a space 39 formed within heat exchanger 29 between tube heads 30 and 32. The other end of space 39 is connected to the upper part of evaporator 23 by conduit 22.

A conduit 40 communicates with the bottom of absorber 35 while a second conduit 41 extends through the bottom of the absorber so that its open upper end is some distance above the bottom of the absorber but not above the lower part of conduit 34. Both conduits 40 and 41 extend within a liquid heat exchange jacket 42, are wound in the form of coils around an extension of flue 11 and thence extend upwardly and communicate with the upper part of generator 10. A conduit 43 connects the lower part of generator 10 with end of jacket 42 while a conduit 44 connects the other end of the jacket with the upper part of absorber 35.

This apparatus operates as follows:

The solution consisting of a refrigerant, such as ammonia, dissolved in an absorbent for instance, water, is contained within generator 10. Upon the application of heat thereto from gas burner 12 ammonia vapor is evolved from this solution and passes upwardly through conduit 13 along with some water vapor. Water vapor is condensed during its passage through the apertures 20, due to cooling action of liquid ammonia in rectifier jacket 14, as will be explained later, and runs back to the generator. The substantially pure ammonia vapor passes from the upper end of conduit 13 through conduit 15 into condenser jacket 16 where it is liquefied due to the cooling action of the water in conduit 17. The liquefied ammonia passes from jacket 16 through conduit 18 into rectifier jacket 14. The level at which the liquid will stand in jacket 14 is determined by the highest point of conduit 21.

The liquid ammonia within jacket 14 is below the temperature at which the water vapor in conduit 13 will condense and hence will act to cool the vapors passing through conduit 13 sufficiently to condense the water vapor. The heat thus absorbed by the ammonia within jacket 14 will cause the vaporization of some of this ammonia, which vapor will pass through conduit 19 to condenser jacket 16 where it will be recondensed.

Liquid ammonia will pass through conduit 21 to the upper part of evaporator 23 where it will come in intimate contact with a gas inert with respect to ammonia, for instance hydrogen, which is introduced through conduit 22. The ammonia will evaporate in the presence of, and diffuse into, the hydrogen and the comparatively heavy mixture of vaporous ammonia and hydrogen will pass downwardly through evaporator 23 and through conduit 27 to space 28 within gas heat exchanger 29. From here it will pass through tubes 31 to space 33 and thence through conduit 34 to the lower part of absorber 35. In the absorber the mixture of vaporous ammonia and hydrogen will come in contact with absorption fluid containing but little ammonia in solution which is introduced through conduit 44. The ammonia will be absorbed by this absorption fluid while the hydrogen will remain unabsorbed and pass from the upper part of absorber 35 through conduit 38 to space 39 within heat exchanger 29. In space 39 this hydrogen will be cooled by the cold mixture of ammonia and hydrogen within tubes 31. From space 39 the hydrogen will pass through conduit 22 to the upper part of evaporator 25.

The strong solution of ammonia in water formed in absorber 35 will collect in the bottom thereof and pass therefrom through conduit 40. In that portion of conduit 40 which is in the form of a coil around flue 11 the strong solution will be heated with the result that vapor will be formed. Vapor thus formed will lift the remaining liquid according to the well known thermo-siphon or percolator principle through the remainder of conduit 40 into the upper part of generator 10. Within the generator ammonia will again be driven from solution and the weak solution will pass by gravity from the lower part of generator 10 through conduit 43 to heat exchange jacket 42 and thence through conduit 44 to the upper part of the absorber.

Under normal operating conditions conduit 40 will be able to convey all the liquid which is to be circulated from the absorber to the generator. However, should the capacity of conduit 40 be reduced in any way, as for instance, by the clogging of this conduit by impurities, liquid will accumulate in the lower part of absorber 35 until such a level is reached that liquid will flow into conduit 41. This liquid will pass through conduit 41 to that portion of the conduit which is formed in a coil around flue 11 where the application of heat will cause the vaporization of a portion of the liquid which will cause the remaining liquid to be raised through conduit 41 to the upper part of generator 10.

It is desirable that conduits 40 or 41 be of considerable length between the absorber and the coil around flue 11, or preferably that both conduits be of extended length, as shown. This length causes resistance to be offered to the flow of liquid through the conduit or conduits and hence conditions existing in one coil will not be readily communicated back to the absorber and to the other coil. This is of importance when flow through conduit 40 is partially impaired by the presence of foreign matter in the conduit but some flow therethrough still takes place. In this case the coil made up of conduit 40 has less fluid to pump than the coil made up of conduit 41 and hence if these two conduits were short, pumping action of the latter might be interfered with. The increased length also makes possible an efficient heat exchanger to transfer heat from the warm solution in jacket 42 to the comparatively cool solution in conduits 40 or 41.

Both conduits 40 and 41 extend downwardly from the absorber to a point below the coils around flue 11 and thus a liquid seal may be formed in these conduits. This is particularly important with respect to conduit 41, for under normal operating conditions when no liquid is being conveyed through this conduit, vapor from the upper part of the generator could pass therethrough to the absorber if it were not for this seal.

Even though no liquid is passing through conduit 41 the coil made up of this conduit around flue 11 will not become overheated due to the fact that liquid is passing through conduit 40. The same is true with respect to the coil made up of conduit 40 if this conduit should become completely stopped so that no flow would take place therethrough. In this case the coil would not become overheated as there would be liquid within the coil made up of conduit 41.

While I have described a more or less specific embodiment of my invention it is to be understood that modifications thereof fall within its scope which is to be limited only by the appended claims viewed in the light of the prior art.

I claim:

1. In a refrigerating apparatus, in combination, a generator, an absorber, means to convey liquid from said generator to said absorber, a conduit connecting the bottom of said absorber with the upper part of said generator, a conduit connecting an intermediate point of said absorber with the upper part of said generator and means to heat both of said conduits.

2. In a refrigerating apparatus, in combination, a generator, an absorber, means to convey liquid from said generator to said absorber, a conduit connecting the bottom of said absorber with the upper part of said generator, a conduit connecting an intermediate point of said absorber with the upper part of said generator and means to heat portions of said conduits, one of said conduits being of extended length between said absorber and the heated portion of said conduit.

3. In a refrigerating apparatus, in combination, a generator, an absorber, means to convey liquid from said generator to said absorber, a conduit connecting the bottom of said absorber with the upper part of said generator, a conduit connecting an intermediate point of said absorber with the upper part of said generator and means to heat portions of said conduits, said conduits being of extended length between said absorber and the said heated portions.

4. In a refrigerating apparatus, in combination, a generator, an absorber, means to convey liquid from said generator to said absorber, a conduit connecting the bottom of said absorber with the upper part of said generator, a conduit connecting an intermediate point of said absorber with the upper part of said generator and means to heat a portion of each of said conduits, said second mentioned conduit being arranged to have a liquid seal formed therein between said absorber and the portion of said second mentioned conduit which is heated.

5. In a refrigerating apparatus in combination, a generator, an absorber, a flue within said generator and extending beyond the lower end thereof, means to convey liquid from said generator to said absorber, a conduit connecting the bottom of said absorber with the upper part of said generator and wound in the form of a coil around the extending end of said flue, a second conduit connecting an intermediate point of said absorber with the upper part of said generator and wound in the form of a coil between turns of said first mentioned coil and means to heat said flue.

6. In a refrigerating apparatus, in combination, a generator, an absorber, a flue within said generator and extending beyond the lower end thereof, means to convey liquid from said generator to said absorber, a conduit connecting the bottom of said absorber with the upper part of said generator and wound in the form of a coil around the extending end of said flue, a second conduit connecting an intermediate point of said absorber with the upper part of said generator and wound in the form of a coil between turns of said first mentioned coil and means to heat said flue, said conduits being of an extended length between said absorber and said coils.

7. In an absorption refrigerating apparatus, a first vessel containing liquid, a second vessel at a higher level than said first vessel, means to convey liquid from said first vessel to said second vessel comprising two conduits in parallel and means for providing presence of vapor in said conduits, one of said conduits being of extended length between the place where the vapor is provided and said first mentioned vessel.

8. In an absorption refrigerating apparatus, a first vessel containing liquid, a second vessel at a higher level than said first vessel, means to convey liquid from said first vessel to said second vessel comprising two conduits in parallel, said conduits communicating with said first vessel at different levels and means for providing presence of vapor in said conduits.

9. In an absorption refrigerating apparatus, a first vessel containing liquid, a second vessel at a higher level than said first vessel, means to convey liquid from said first vessel to said second vessel comprising two conduits in parallel, said conduits communicating with said first vessel at separated points and means for providing presence of vapor in said conduits, one of said conduits being of extended length between the place where the vapor is provided and said first mentioned vessel.

10. In an absorption refrigerating apparatus, a first vessel containing liquid, a second vessel at a higher level than said first vessel, means to convey liquid from said first vessel to said second vessel comprising two conduits in parallel and means for providing presence of vapor in said conduits, one of said conduits offering an appreciable resistance to the flow of liquid therethrough from said first vessel to the place where the vapor is provided in the conduit.

11. In an absorption refrigerating apparatus, a first vessel containing liquid, a second vessel at a higher level than said first vessel, means to convey liquid from said first vessel to said second vessel comprising two conduits in parallel, said conduits communicating with said first vessel at separated points and means for providing presence of vapor in said conduits, one of said conduits arranged for forming a liquid seal between the place where the vapor is provided and said first vessel.

12. In an absorption refrigerating apparatus, a first vessel containing liquid, a second vessel at a higher level than said first vessel, means to convey liquid from said first vessel to said second vessel comprising two conduits in parallel, said conduits communicating with said first vessel at separated points and means for providing presence of vapor in said conduits, one of said conduits arranged for forming a liquid seal below the place where the vapor is provided and between said place and said first vessel.

In testimony whereof I have affixed my signature.

CARL GEORG MUNTERS.